(12) United States Patent
Bator et al.

(10) Patent No.: US 9,984,482 B2
(45) Date of Patent: May 29, 2018

(54) GRAPHICAL USER INTERFACE HAVING ENHANCED TOOL FOR CONNECTING COMPONENTS

(71) Applicant: Ab Initio Technology LLC, Lexington, MA (US)

(72) Inventors: Erik Bator, Needham, MA (US); Ilya Rozenberg, Auburndale, MA (US); Daniell Stevens, Watertown, MA (US); Dan Teven, Sharon, MA (US); Fredric M. White, Maynard, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days. days.

(21) Appl. No.: 13/974,537

(22) Filed: Aug. 23, 2013

(65) Prior Publication Data
US 2015/0058772 A1 Feb. 26, 2015

(51) Int. Cl.
*G06T 11/20* (2006.01)

(52) U.S. Cl.
CPC ........ *G06T 11/206* (2013.01); *G06T 2200/24* (2013.01)

(58) Field of Classification Search
CPC .. G06T 11/206; G06F 17/30716; G06F 19/26; G06F 9/4443; G06F 8/34; G06F 3/048; G06F 3/0486
See application file for complete search history.

(56) References Cited

U.S. PATENT DOCUMENTS

| | | | | |
|---|---|---|---|---|
| 8,205,183 B1* | 6/2012 | Goh | .................... | G06F 17/5045 716/126 |
| 8,669,982 B2* | 3/2014 | Breeds et al. | ................ | 345/440 |
| 8,990,777 B2* | 3/2015 | Gounares | ............ | G06F 11/3664 717/125 |
| 8,997,023 B2 | 3/2015 | Pavan et al. | | |
| 2007/0240080 A1 | 10/2007 | Eldridge et al. | | |
| 2008/0027782 A1* | 1/2008 | Freire et al. | ...................... | 705/9 |
| 2008/0270444 A1 | 10/2008 | Brodie | | |
| 2009/0282364 A1 | 11/2009 | White et al. | | |
| 2013/0159904 A1 | 6/2013 | Kelappan et al. | | |
| 2014/0137019 A1* | 5/2014 | Paulsen et al. | ............... | 715/769 |
| 2014/0359560 A1* | 12/2014 | Avadhanula | .............. | G06F 8/35 717/105 |

OTHER PUBLICATIONS

"Dynamic Ports"—GOJS—Interactive JavaScript Diagrams in HTML—Nov. 1, 2012 as seen via The Wayback Machine, https://web.archive.org/web/20121101022046/http://gojs.net/latest/samples/dynamicPorts.html.*
International Search Report and Written Opinion in PCT/US2014/52067, dated Nov. 12, 2014 (8 pages).
European Search Report issued in Application 14837982.9, dated Feb. 7, 2017 (7 pages).

* cited by examiner

*Primary Examiner* — Antonio A Caschera
(74) *Attorney, Agent, or Firm* — Fish & Richardson P.C.

(57) ABSTRACT

In a general aspect, a method includes displaying a first component of a graph on a user interface, including displaying at least one port of the first component; responsive to a user interaction with the displayed first component, displaying a representation of one or more ports of the first component that is distinct from the display of the first component; and enabling the user to generate a connection between the representation of a particular one of the ports of the first component and a port of a second component of the graph.

51 Claims, 11 Drawing Sheets

GRAPHICAL USER INTERFACE HAVING ENHANCED TOOL FOR CONNECTING COMPONENTS

BACKGROUND

This description relates to generating connections between components in a graphical user interface.

A graphical user interface can be used to create or manipulate the components of a dataflow graph. For instance, components can be added to or removed from the graph, and connections can be generated between components representative of data flow between the components.

SUMMARY

In a general aspect, a method includes displaying a first component of a graph on a user interface, including displaying at least one port of the first component. The method includes, responsive to a user interaction with the displayed first component, displaying a representation of one or more ports of the first component that is distinct from the display of the first component. The method includes enabling the user to generate a connection between the representation of a particular one of the ports of the first component and a port of a second component of the graph.

In a general aspect, software stored on a computer-readable medium includes instructions for causing a computer system to display a first component of a graph on a user interface, including displaying at least one port of the first component. The software includes instructions for causing the computer system to, responsive to a user interaction with the displayed first component, display a representation of one or more ports of the first component that is distinct from the display of the first component. The software includes instructions for causing the computer system to enable the user to generate a connection between the representation of a particular one of the ports of the first component and a port of a second component of the graph.

In a general aspect, a computing system includes at least one processor configured to display a first component of a graph on a user interface, including displaying at least one port of the first component. The processor is configured to, responsive to a user interaction with the displayed first component, display a representation of one or more ports of the first component that is distinct from the display of the first component. The processor is configured to enable the user to generate a connection between the representation of a particular one of the ports of the first component and a port of a second component of the graph.

In a general aspect, a computing system includes means for displaying a first component of a graph on a user interface, including displaying at least one port of the first component; means for, responsive to a user interaction with the displayed first component, displaying a representation of one or more ports of the first component that is distinct from the display of the first component; and means for enabling the user to generate a connection between the representation of a particular one of the ports of the first component and a port of a second component of the graph.

Embodiments may include one or more of the following features.

Displaying the representation of the ports includes displaying a list of the ports.

The user interaction includes hovering a pointer over the first component.

Displaying the first component includes displaying fewer than all of the ports of the first component.

Displaying the representation of the ports includes displaying a representation of ports that are not included in the display of the first component.

Displaying the first component includes not displaying optional ports of the first component prior to the user interaction with the first component.

Displaying the first component includes displaying only the ports of the first component that are associated with a connection.

Displaying the representation of the ports does not alter the display size of the first component.

The representation of the ports includes an indication of the status of each port.

The representation of a particular port changes responsive to a user interaction with the representation of the particular port to indicate a status of the particular port. In some cases, the status of a port indicates whether the port is available for a connection.

Enabling the user to generate a connection includes enabling the user to select the particular one of the ports from the representation of the ports.

Enabling the user to generate a connection includes enabling the user to drag a pointer from the particular one of the ports of the first component to the second component. In some cases, enabling the user to drag the pointer includes enabling the user to drag the pointer from the particular one of the ports of the first component to the port of the second component. In some cases, a representation of one or more of the ports of the second component is displayed responsive to the user dragging the pointer to the second component. In some cases, only ports of the second component that are available for a connection are included in the representation of the ports of the second component.

In a general aspect, a method of connecting components in a graph includes displaying, in a user interface, a graph having a first component and a second component, the first component having a port. The method includes displaying a symbol representing the port of the first component, the symbol being distinct from the first component. The method includes enabling a connection to be made between the port of the first component and a second component in response to user input connecting the symbol to the second component.

In a general aspect, software stored on a computer-readable medium, for connecting components in a graph, includes instructions for causing a computer system to display, in a user interface, a graph having a first component and a second component, the first component having a port. The software includes instructions for causing the computer system to display a symbol representing the port of the first component, the symbol being distinct from the first component. The software includes instructions for causing the computer system to enable a connection to be made between the port of the first component and a second component in response to user input connecting the symbol to the second component.

In a general aspect, a computing system for connecting components in a graph includes at least one processor configured to display, in a user interface, a graph having a first component and a second component, the first component having a port. The processor is configured to display a symbol representing the port of the first component, the symbol being distinct from the first component. The processor is configured to enable a connection to be made between the port of the first component and a second component in response to user input connecting the symbol to the second component.

In a general aspect, a computing system for connecting components in a graph includes means for displaying, in a user interface, a graph having a first component and a second component, the first component having a port; means for displaying a symbol representing the port of the first component, the symbol being distinct from the first component; and means for enabling a connection to be made between the port of the first component and a second component in response to user input connecting the symbol to the second component.

Embodiments may include one or more of the following features.

The user input connecting the symbol to the second component includes a dragging action from the symbol to the second component. In some cases, the dragging action starts at the symbol representing the port of the first component and ends at a port of the second component. In some cases, the dragging action starts at the symbol representing the port of the first component and ends at a second symbol representing a port of the second component, the second symbol being distinct from the second component.

Displaying a symbol representing the port of the first component includes displaying a window that includes the symbol.

Enabling a connection to be made between the port of the first component and a second component includes enabling a connection to be made between the port of the first component and a second component without changing a display size of the first component.

In a general aspect, a method of connecting components in a graph includes interacting with a first component of a graph, the first component having a first port that is initially hidden from view, and causing a first symbol representing the first port to be displayed, the first symbol being distinct from the first component. The method includes using a click-and-drop action to connect the first port of the first component to a second port of a second component of the graph by selecting the first symbol and applying a dragging action from the first symbol to the second port or a second symbol representing the second port.

In a general aspect, software stored on a computer-readable medium, for connecting components in a graph, includes instructions for causing a computer system to interact with a first component of a graph, the first component having a first port that is initially hidden from view, and causing a first symbol representing the first port to be displayed, the first symbol being distinct from the first component. The software includes instructions for causing the computer system to use a click-and-drop action to connect the first port of the first component to a second port of a second component of the graph by selecting the first symbol and applying a dragging action from the first symbol to the second port or a second symbol representing the second port.

In a general aspect, a computing system for connecting components in a graph includes at least one processor configured to interact with a first component of a graph, the first component having a first port that is initially hidden from view, and causing a first symbol representing the first port to be displayed, the first symbol being distinct from the first component. The processor is configured to use a click-and-drop action to connect the first port of the first component to a second port of a second component of the graph by selecting the first symbol and applying a dragging action from the first symbol to the second port or a second symbol representing the second port.

In a general aspect, a computing system for connecting components in a graph includes means for interacting with a first component of a graph, the first component having a first port that is initially hidden from view, and causing a first symbol representing the first port to be displayed, the first symbol being distinct from the first component; and means for using a click-and-drop action to connect the first port of the first component to a second port of a second component of the graph by selecting the first symbol and applying a dragging action from the first symbol to the second port or a second symbol representing the second port.

Embodiments may include one or more of the following features.

Causing a first symbol representing the first port to be displayed comprises causing a window that includes the first symbol to be displayed.

The dragging action causes a flow to be dragged to the second port or the second symbol representing the second port.

Aspects can include one or more of the following advantages.

The approach to generating connections described herein allows a user to easily make connections between components displayed on a user interface without interfering with the arrangement of the displayed components. In addition, the approach to generating connections enables a user to manipulate and connect components whose individual connection ports may be hidden or have small sizes.

Other features and advantages of the invention will become apparent from the following description, and from the claims.

DESCRIPTION

We describe here an approach to generating connections between components displayed in a graphical development environment. For instance, components can be shown in a graphical user interface, and connections can be generated between the components even when one or more of the relevant connection ports of the components are not displayed on the components themselves. In some examples, a connection can be generated using a simple and intuitive drag-and-drop action from a representation of a connection port in a first component to a second component, even when the connection port itself is initially hidden from view.

Figure 1:
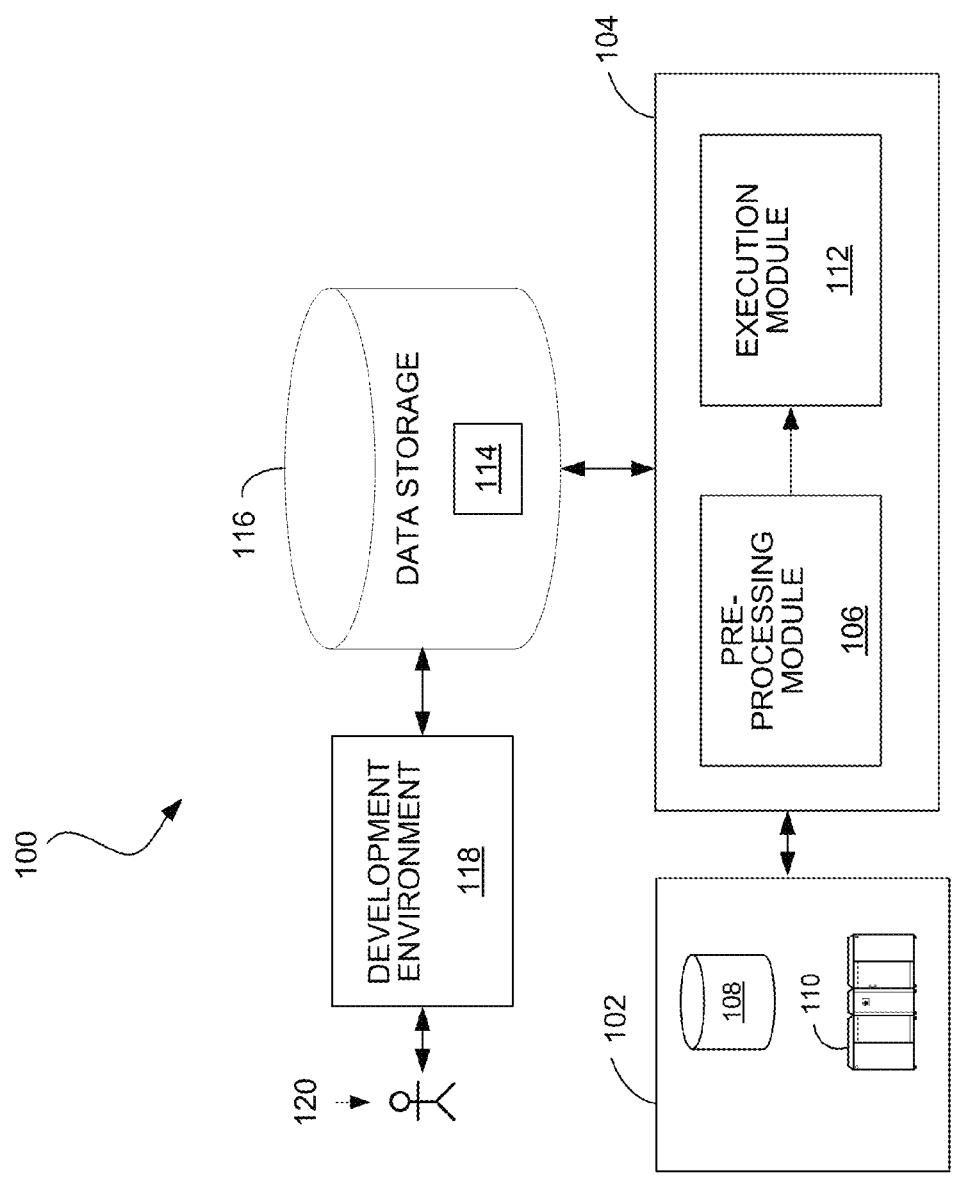
FIG. 1 is a block diagram of a data processing system.

FIG. 1 shows an exemplary data processing system 100 that includes a data source 102 and an execution environment 104. The data source 102 may include one or more sources of data such as storage devices or connections to online data streams, each of which may store or provide data in any of a variety of formats (e.g., database tables, spreadsheet files, flat text files, or a native format used by a mainframe). The execution environment 104 includes a pre-processing module 106 and an execution module 112. The execution environment 104 may be hosted, for example, on one or more general-purpose computers under the control of a suitable operating system, such as a version of the UNIX operating system. For example, the execution environment 104 can include a multiple-node parallel computing environment including a configuration of computer systems using multiple central processing units (CPUs) or processor cores, either local (e.g., multiprocessor systems such as symmetric multi-processing (SMP) computers), locally distributed (e.g., multiple processors coupled as clusters or massively parallel processing (MPP) systems), remote, remotely distributed (e.g., multiple processors coupled via a local area network (LAN) and/or wide-area network (WAN)), or any combination thereof.

The pre-processing module 106 reads data from the data source 102, performs any appropriate processing of the data, and stores the processed data. Storage devices providing the data source 102 may be local to the execution environment 104, for example, the data may be stored on a storage medium (e.g., hard drive 108) connected to a computer hosting the execution environment 104. The storage devices may also be remote to the execution environment 104, for example, being hosted on a remote system (e.g., mainframe 110) in communication with a computer hosting the execution environment 104 over a remote connection (e.g., provided by a cloud computing infrastructure).

The execution module 112 uses the processed data generated by the pre-processing module 106 to execute a specified process. The processing module 106 may output data 114 that may be stored back in the data source 102 or in a data storage system 116 accessible to the execution environment 104, or otherwise used. The data storage system 116 is also accessible to a development environment 118 in which a developer 120 is able to develop data processing applications. The development environment 118 is, in some implementations, a system for developing applications as computation graphs or dataflow graphs that include vertices (representing data processing components or datasets) connected by directed links (representing flows of work elements, i.e., data) between the vertices. For example, such an environment is described in more detail in U.S. Publication No. 2007/0011668, titled "Managing Parameters for Graph-Based Applications," incorporated herein by reference. A system for executing such graph-based computations is described in U.S. Pat. No. 5,966,072, titled "EXECUTING COMPUTATIONS EXPRESSED AS GRAPHS." Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The dataflow graphs developed using the development environment 118 can be stored in, e.g., the data storage 116 and accessed by the execution environment 104. The execution environment 104 may execute the dataflow graphs to carry out processes associated with the components of the dataflow graphs to process the data received from the data source 102.

Figure 2:
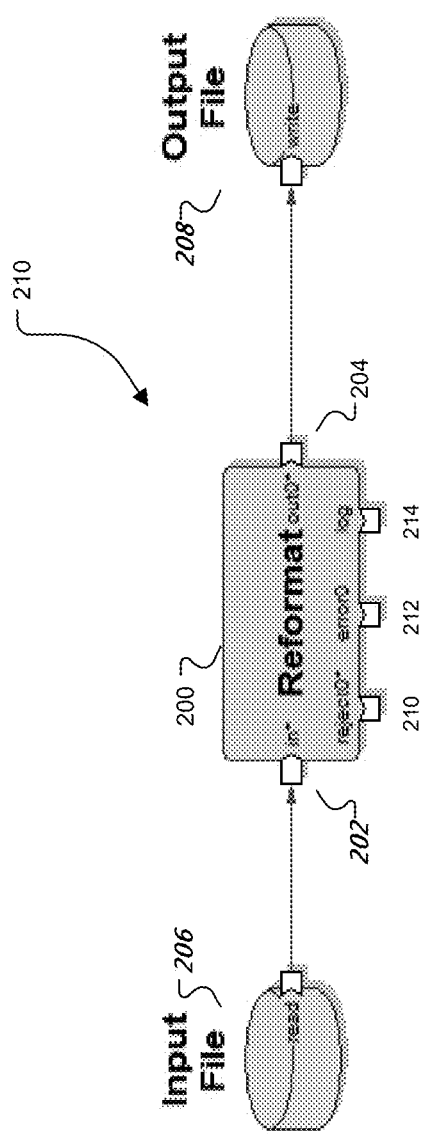
FIG. 2 is an example of components.

Referring to FIG. 2, the development environment 118 may provide a graphical user interface that shows a dataflow graph 210 having components (e.g., 200, 206, 208). Some of the components may represent corresponding processes. For example, the reformat component 200 represents a reformat process, so that when the dataflow graph 210 is executed by the execution module 112, the reformat process represented by the reformat component 200 is executed.

Each component of the dataflow graph 210 includes one or more connection ports through which the component can be connected by a dataflow connection (also referred to as a "connection") to one or more other components of the dataflow graph. A connection port may be an input port for receiving data into a component or an output port through which data is output from a component. In some examples, a symbol that depicts a connection port may indicate whether the connection port is an input port or an output port. For instance, in the example of FIG. 2, a reformat component 200 has an input port 202 represented by an input port symbol and an output port 204 represented by an output port symbol.

A component may include one or more mandatory connection ports, in which case the component will not execute if there is no connection to each of its mandatory ports. For instance, in the example of FIG. 2, the input port 202 and the output port 204 of the reformat component 200 are mandatory ports. In this example, the input port 202 is connected to an input file 206 and the output port 204 is connected to an output file 208. With these two mandatory connections present, the reformat component 200 may be executed. In this description, for components that represent processes, executing a component means that the process represented by the component is executed.

A component may also have one or more optional connection ports, meaning that it is possible to execute the component even if there is no connection to one or more of its optional ports. For instance, in the example of FIG. 2, the reformat component 200 includes three optional output ports: a reject port 210, an error port 212, and a log port 214. Even though none of the optional ports 210, 212, 214 of the reformat component 200 has a connection, the reformat component 200 may still be executed.

In some examples, the ports of a component may all be displayed (e.g., as is the case for the reformat component 200). In some examples, only the ports that have a connection may be displayed. In some examples, only mandatory ports may be displayed. In some examples, mandatory ports may be displayed as a default and a user (such as a developer developing the dataflow graph in the development environment 118) may configure the graphical user interface such that certain ports (e.g., all ports, all optional ports, all disconnected ports, etc.) are displayed, e.g., in order to generate a connection to or from an optional port. For instance, each optional port of a component may be hidden unless it has a connection. By displaying only the optional ports that have a connection, a dataflow graph can appear less cluttered and the size and alignment of the components of the dataflow graph can generally be maintained.

The following describes a technique for how connections can be made to one or more hidden optional ports of one component to the ports of other components. FIGS. 3A to 3F show an example in which a connection is generated from a hidden optional port of a reformat component to a port of an errors database. In this example, a pointing device such as a mouse having a selection button is used. Other selection devices (e.g., stylus on a touch screen) and selection command inputs (e.g., touch or gesture inputs) can also be used.

Figure 3A:
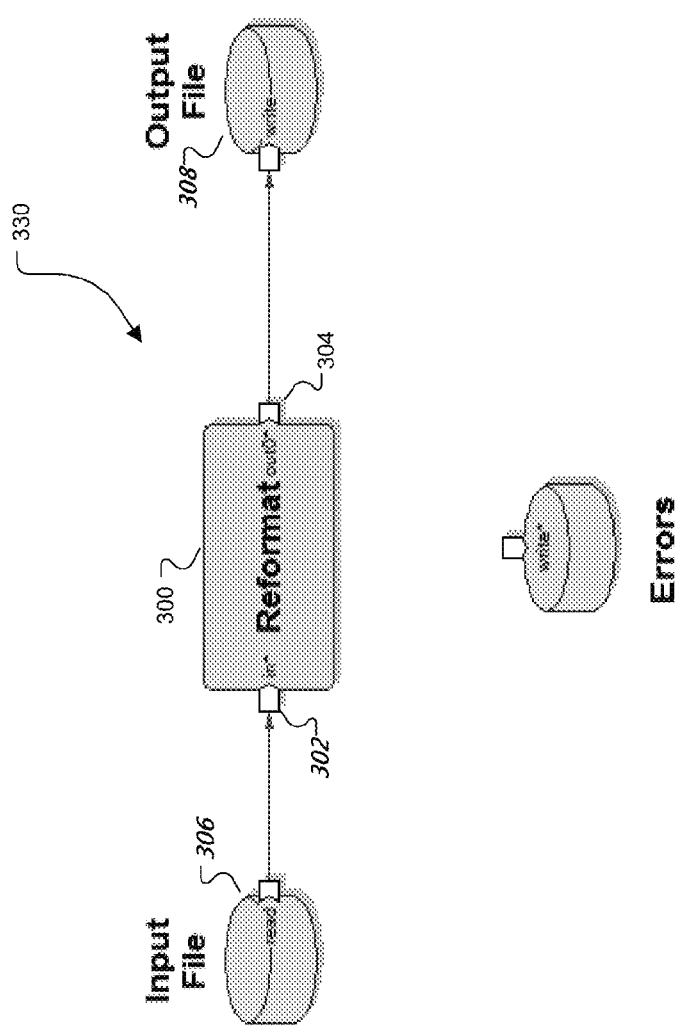
FIGS. 3A-3F are examples of a process for generating a connection.

Referring to FIG. 3A, in some examples, a reformat component 300 is configured to display its mandatory ports (an input port 302 and an output port 304) and any optional port that has a connection. Thus, in the example shown, the input port 302 is connected to a read port of an input file 306 and the output port 304 is connected to a write port of an output file 308. The reformat component also has three optional ports: a reject port, an error port, and a log port. In the example of FIG. 3A, none of these optional ports has a connection and thus the optional ports are not displayed on the reformat component 300. In the example of FIG. 3A, the graphical user interface also shows an errors database 324.

Figure 3B:
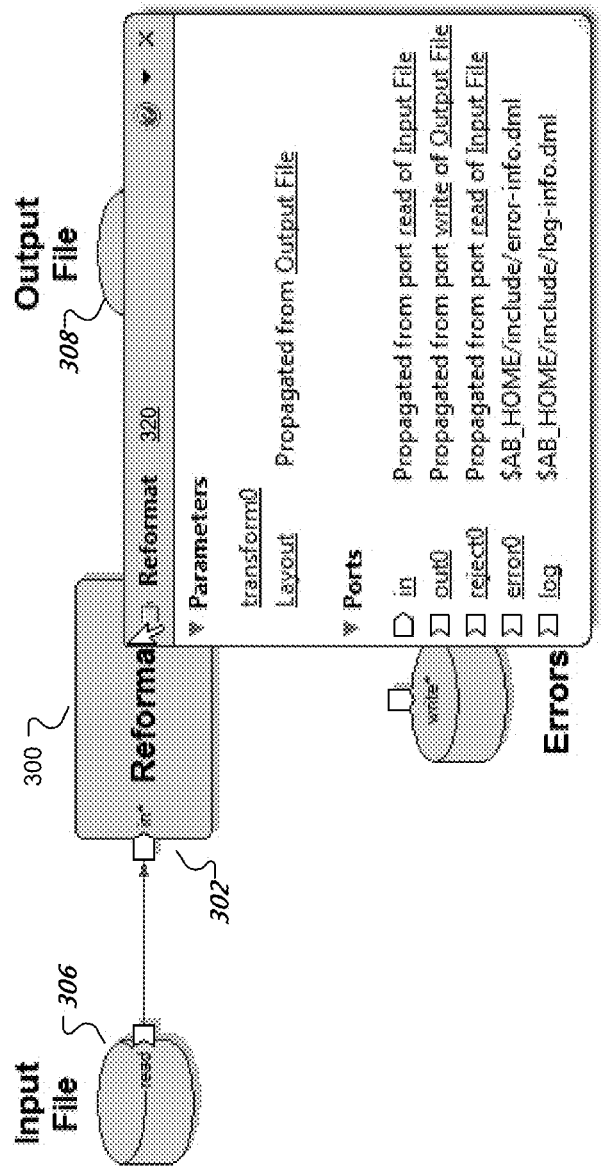

Referring to FIG. 3B, in some implementations, generating a connection between a hidden connection port (e.g., an optional port that is not displayed) of the reformat component 300 and another component, such as the errors database 324, can be achieved using a representation of some or all of the connection ports of the reformat component 300 that appears when a user interacts with the reformat component 300, e.g., by hovering a pointer (such as a mouse pointer) over the reformat component 300. For example, the representation may be a representation that is distinct from the first component itself, such as a pop-up window or menu 320 that includes a list of some or all of the connection ports of the reformat component 300. For example, the pop-up menu 320 may include the two mandatory ports (the input port 302 and the output port 304) and the three optional ports (a reject port, an error port, and a log port). In some examples, the distinct representation of the connection ports can overlap with the displayed component.

The pop-up menu 320 is initially not shown on the graphical user display, and appears after the user interacts with the reformat component 300. In some examples, to cause the menu 320 to be shown, the user may hover the pointer anywhere over the reformat component 300 for a predetermined amount of time (e.g., 0.5 seconds, 1 second, or 2 seconds). In some examples, the user may hover the pointer only over certain "hot spots" on the reformat component 300, such as the corners or the center of the reformat component 300.

Figure 3C:
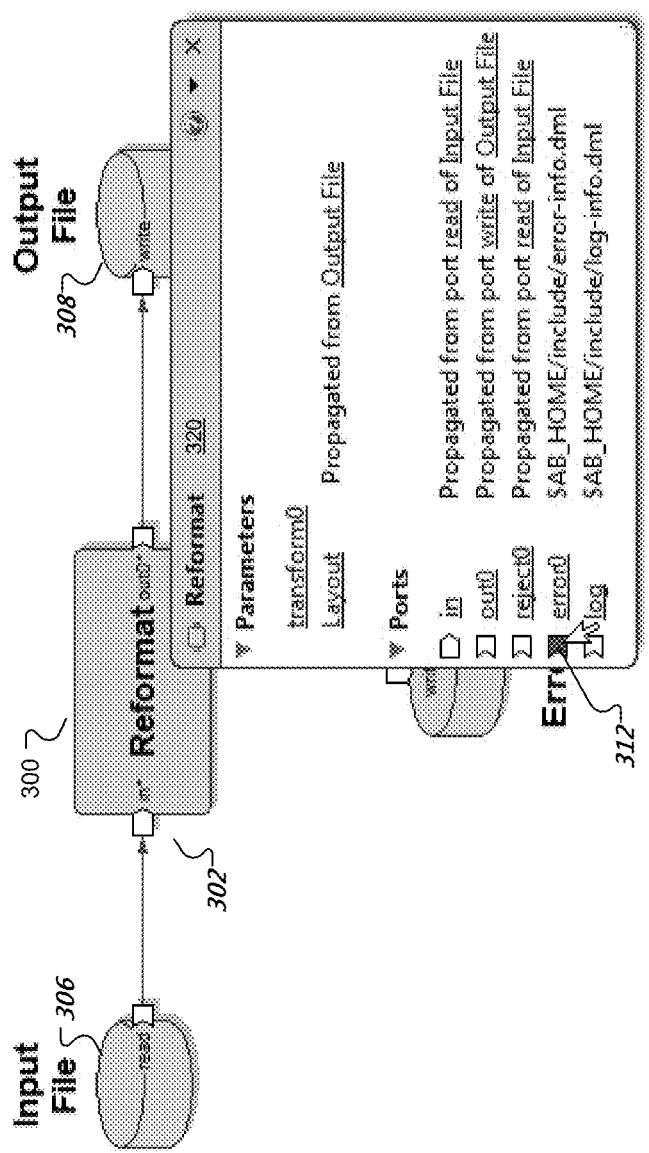
Figure 3D:
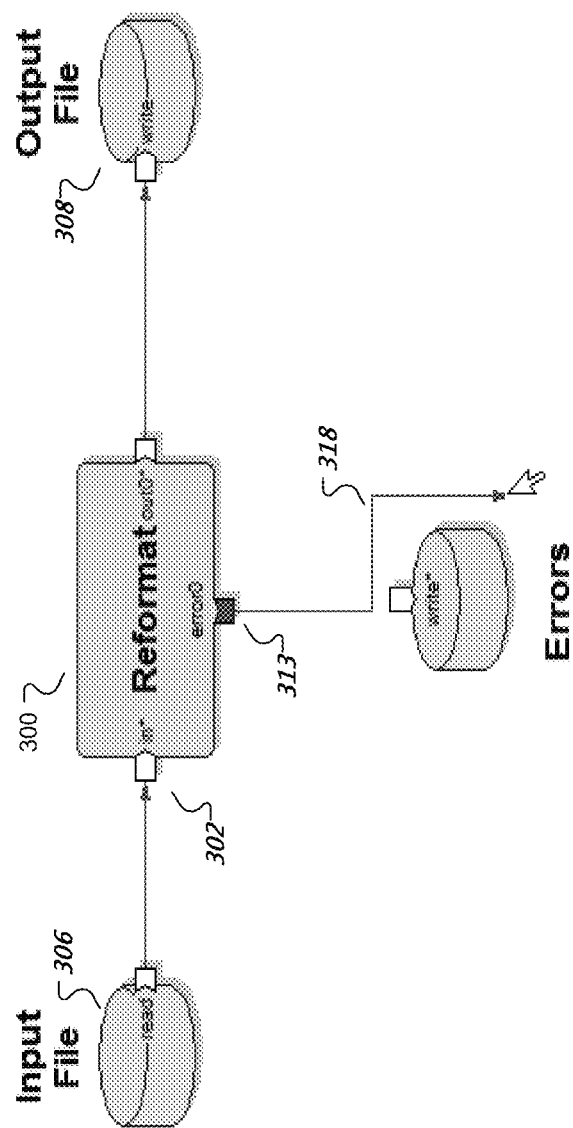

In the examples shown in FIGS. 3B and 3D, the representation of some or all of the connection ports is a menu, but the representation can also have other formats. In some examples, the representation may include fewer than all of the connection ports of the reformat component 300, such as only the hidden ports or only those connection ports that are available for a connection. In some examples, the representation may be a larger version of the reformat component 300, e.g., showing some or all of the connection ports of the reformat component 300.

In some examples, the menu 320 may show details about each of the connection ports listed in the menu 320, such as the name of each connection port, a path associated with each connection port, a name of another connection port or component to which the connection port or component is connected, or other details. In some examples, a symbol may be displayed for each of the connection ports, such as the same symbol that is displayed on a component to indicate a connection port. For instance, in the example of FIG. 3B, the input port 302 is represented by an input port symbol, and the output port 304 and three optional ports (reject port, error port, log port) are each represented by an output port symbol.

In some examples, the menu 320 may indicate the status of each of the connection ports listed in the menu, such as whether each connection port is connected to another component or whether each connection port is available for a connection. For instance, the color, size, or font of the name of a connection port or the color or size of the symbol for the connection port may be used to indicate the status of the connection port.

In some examples, other information about the component may be displayed in the menu 320, such as the name of the component, parameters associated with the component, or a processing status of the component. In some examples, other information about the component may be accessible by selecting the component, e.g., by double clicking on the component or right clicking on the component.

The names of or symbols for the connection ports in the menu may be live links that respond to user interaction. For instance, a user may select a particular connection port from the menu 320, e.g., by hovering a pointer (e.g., a mouse pointer) over the name of or symbol for the connection port. If the selected connection port is available for a connection, the representation of that connection port in the menu 320 may change. In some examples, the symbol for a connection port may change size or color, flash, or undergo another change to indicate that the connection port is available for a connection. In some examples, the name of a connection port may change size, font, color, or highlighting; flash, or undergo another change to indicate that the connection port is available for a connection. In some examples, the change to the symbol for or name of a connection port may be the same change that occurs when a user hovers over a connection port of a component. In some examples, the representation of the connection port may change in one way if the connection port is available for a connection and in another way if the connection port is not available for a connection. In some examples, the pointer (e.g., the mouse pointer) may change when it hovers over a connection port that is available for a connection. For instance, the mouse pointer may change shape, blink, or undergo another change.

For instance, referring to FIG. 3C, when the user hovers a mouse pointer over a symbol 312 for the error port in the menu 320, the symbol 312 for the error port is filled in to indicate that the error port is available for a connection.

To initiate a connection from a particular connection port in the menu 320, the user may select and drag the symbol for or name of the particular connection port in the menu 320, e.g., by clicking and dragging a mouse or by tapping and dragging on a screen. In the menu 320, the symbols for the connection ports, the names of the connection ports, or both, may be live links that are responsive to selection and drag-and-drop actions in the same way that a connection port included on a component is responsive to those actions. In some examples, a connection may be initiated in another way, such as by double-clicking or double tapping on the desired connection port or by right-clicking on the desired connection port.

Once the user has selected and dragged from the particular connection port, the menu 320 disappears and the particular connection port is displayed as a visible connection port on the reformat component 300 in the dataflow graph 330. A flow is displayed connected to the particular connection port.

For instance, referring to FIG. 3D, a user may initiate a connection from the error port in the menu 320 (shown in FIG. 3C) by clicking on and dragging the symbol 312 for the error port. This action causes the menu 320 to disappear. An error port 313 is then displayed as a visible connection port on the reformat component 300, and a flow 318 is displayed connected to the error port 313. In this example, when the user drags the symbol 312 from the menu 320, it indicates to the graphical user interface that the user intends to make a connection from the error port 313 represented by the symbol 312. When the menu 320 disappears, the error port 313 is displayed on the reformat component 300, and the pointer automatically moves to the end of the flow 318, which allows the user to drag the end of the flow 318 to another component.

In some examples, the user may drag the flow to a target connection port of a second component to generate a connection between the reformat component 300 and the second component. In some examples, if the target connection port is available for a connection, the symbol for or the name of the target connection pot may change when the flow is dragged over the target connection port. In some examples, the symbol for a connection port may change size or color, flash, or undergo another change to indicate that the connection port is available for a connection. In some examples, the name of a connection port may change size, font, color, or highlighting; flash, or undergo another change to indicate that the connection port is available for a connection. In some examples, the representation of the connection port may change in one way if the connection port is available for a connection and in another way if the connection port is not available for a connection.

To complete the connection from the error port 313 to the second component, the user may drop the flow on the target connection port of the second component. This action causes a connection to be generated between the error port 313 of the reformat component 300 and the target connection port of the second component.

Figure 3E:
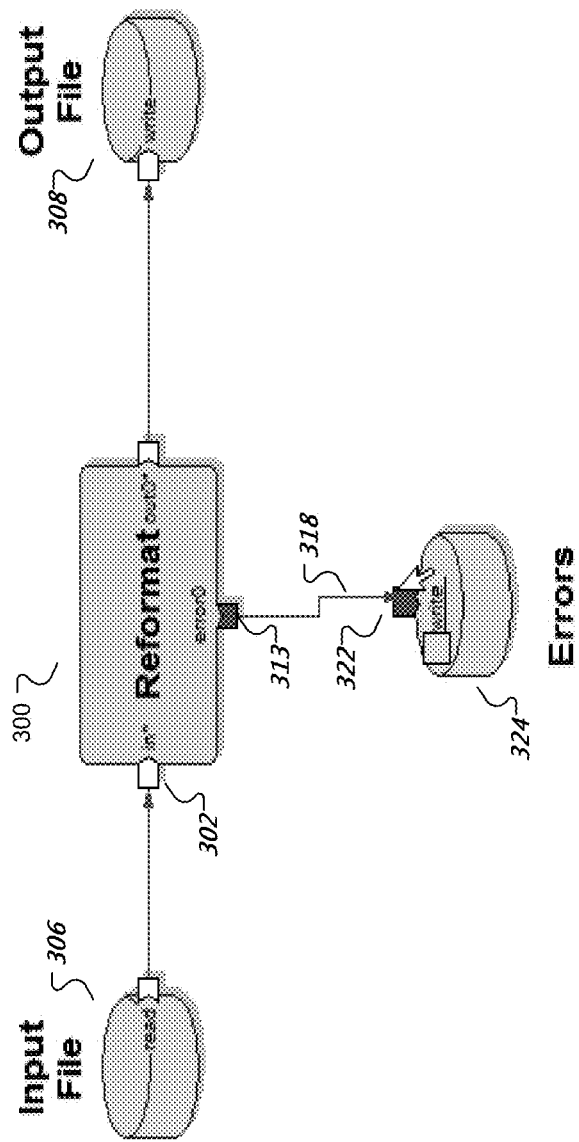

For instance, referring to FIG. 3E, the user may drag the flow 318 to a write port 322 of the errors database 324. In this example, the symbol for the write port 322 is filled in and the name of the write port 322 is highlighted to indicate that the write port 322 is available for a connection.

Figure 3F:
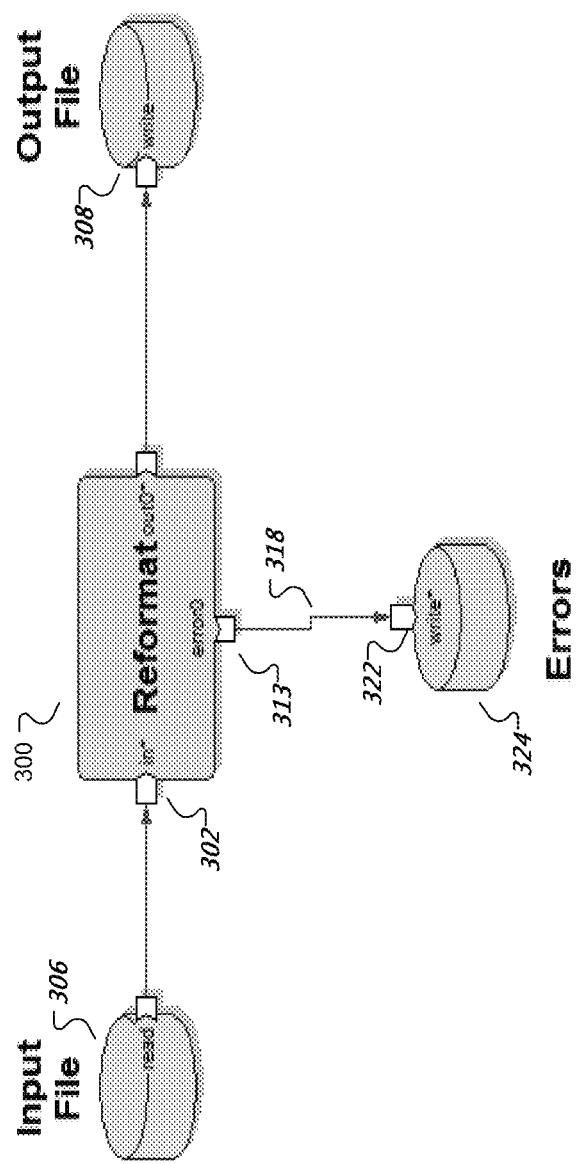

Referring to FIG. 3F, to complete the connection to the errors database 324, the user may drop the flow 318, e.g., by releasing the mouse click. The flow 318 thus becomes a connection between the error port 312 of the reformat component 300 and the write port 322 of the errors database 324.

In the example of FIGS. 3A to 3F, the dataflow graph 330 includes four components. The dataflow graph can also be more complex and include many more components, each component being shown at a relatively small size on the display screen. The connection ports on the components may be so small that it is difficult to select a particular connection port using a mouse pointer. Using the technique described above, the user does not need to change the display zoom scale to enlarge the component to make the connection ports more easily selectable. When the user changes the zoon scale, although the component may become larger and the connection ports easier to select, fewer components may be shown on the display screen, and the second component that the user intends to connect to may not be shown on the screen. After selecting the connection port on the first component, the user may have to reduce the zoom scale, find the second component, increase the zoom scale to enlarge the second component, and select the connection port on the second component. The user may also pan the window to find the second component. The need to change the zoom scale or pan the window several times in order to work with complex dataflow graph is cumbersome. Using the pop-up window or menu 320 allows the user to conveniently make connections between components, reducing the need to change the zoom scale or pan the window. The pop-up window or menu appears when the user needs to select a connection port, and automatically disappears when the connection portion is selected. This way, the user can have a better overall view of a complex dataflow graph while making connections between components of the dataflow graph.

The technique described above also allows the user to conveniently connect hidden connection ports. In some previous graphical user interfaces, the user may have to toggle a switch (e.g., by selecting an option from a pull-down menu) in order for the hidden optional connection ports to appear on the screen and become selectable. After the user makes a connection, the user may have to toggle the switch again in order to hide the other optional connection ports that have no connections. By automatically showing the pop-up window or menu after the pointer hovers above a component for a predetermined amount of time, and automatically removing the pop-up window or menu after a connection port has been selected, there is no need for the user to toggle a switch in order to cause the hidden ports to appear or disappear from the screen.

A feature of the pop-up window or menu 320 is that the user can make connections directly from the connection ports shown in the pop-up window or menu. The symbols for connection ports in the pop-up window or menu are "live" in the sense that actions applied to the symbol in the pop-up window or menu have similar effects as if the actions were applied to a corresponding connection port on the component. In the example in which a computer mouse is the selection device, the user can move the pointer to a symbol in the pop-up window or menu, press the selection button of the mouse to select the symbol, and without releasing the button drag the pointer away from the symbol to cause a flow (e.g., 318 of FIG. 3D) to appear, move the end of the flow to a connection port of a second component, and release the selection button, completing the connection of two components.

In case the connection port of the second component is a hidden port, the user may move the end of the flow to the second component, hover over the second component for a predetermined amount of time until a pop-up window or menu appears showing symbols representing the connection ports of the second component, move the end of the flow to a desired symbol in the pop-up window or menu, and release the selection button, completing the connection to the selected connection port of the second component. In some implementations, only the connection ports of the second component that are available for a connection to the first component are shown on the pop-up window or menu. In this example, releasing the selection button causes the pop-up window or menu associated with the second component to disappear, and the connection port represented by selected symbol appears on the second component, connected by the flow to the connection port of the first component.

In the above examples, connecting a connection port (either visible or hidden) of a first component to a connection port (either visible or hidden) of a second component can be achieved using one press and one release of the selection button of the computer mouse. This allows the user to edit the dataflow graph more conveniently and efficiently, compared to previous methods that do not use the pop-up window or menu.

Using pop-up windows that show live symbols representing connection ports is useful for users that modify dataflow graphs on laptop or tablet computers, or mobile phones, that have relatively small display screens.

Figure 4:
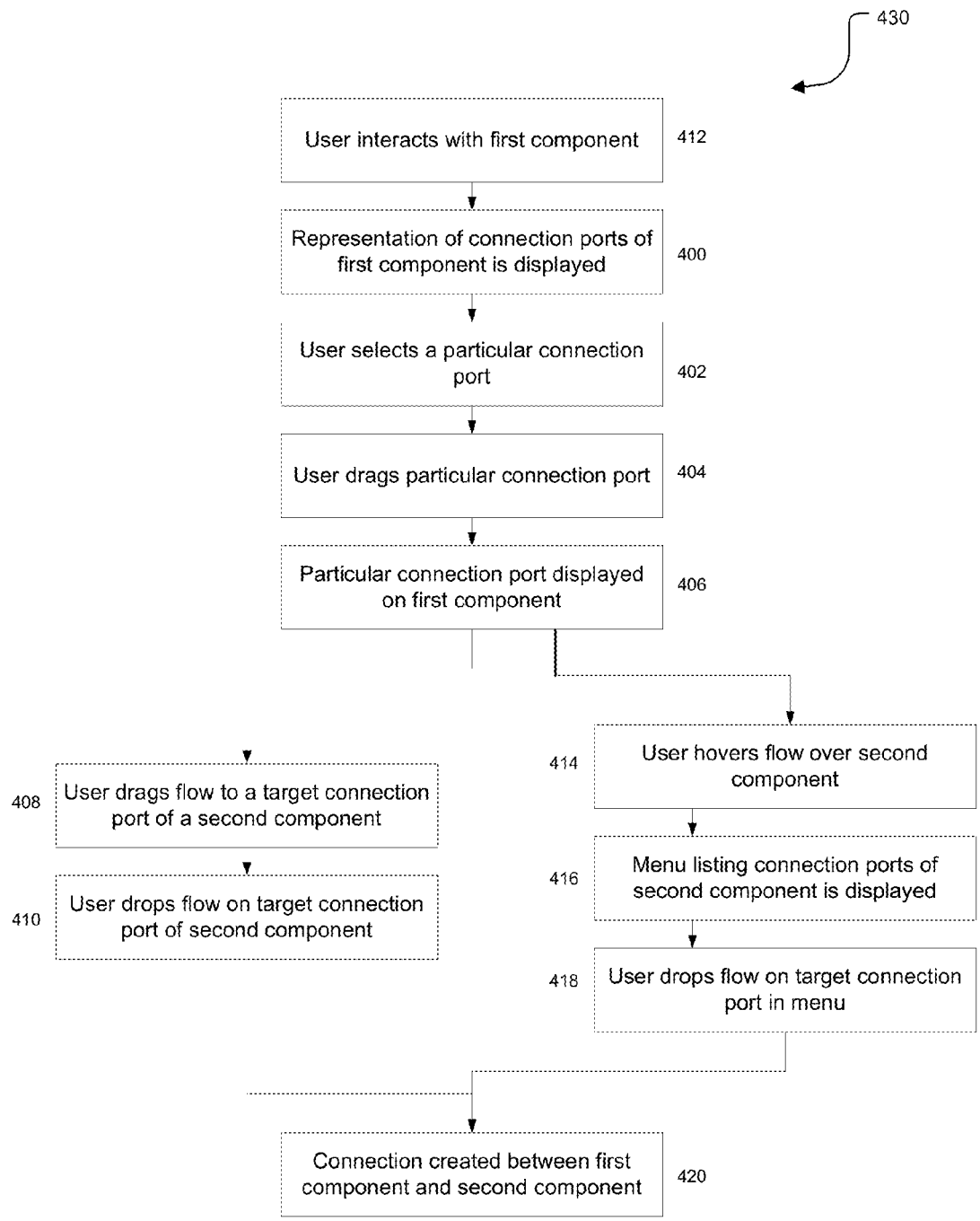
FIG. 4 is a flowchart.

FIG. 4 is a flow diagram of an exemplary process 430 for generating a connection between a hidden connection port of a first component to a connection port of a second component. For example, the process 430 can be implemented by the development environment 118 of FIG. 1.

In process 430, a user interacts with the first component (412), e.g., by hovering a pointer (such as a mouse pointer) over the first component. In some examples, the user may hover the pointer anywhere over the first component. In some examples, the user may hover the pointer only over certain "hot spots" on the first component, such as the corners or the center of the first component. An example of the first component is the reformat component 300 of FIGS. 3A to 3F.

After the user has hovered the pointer over the first component for a predetermined amount of time (e.g., 1 to 2 seconds), a representation of some or all of the connection ports of the first component is displayed (400). For instance, the representation may be a representation that is distinct from the first component itself, such as a pop-up menu including a list of some or all of the connection ports of the first component. In some examples, the representation may include fewer than all of the connection ports of the first component, such as only the hidden ports or only those connection ports that are available for a connection. In some examples, the representation may be a larger version of the first component, e.g., showing some or all of the connection ports of the first component. As example of the representation is the menu 320 shown in FIGS. 3B and 3C. In the following description of the process 430, a menu of some or all of the connection ports of the first component will be used as an example of the representation of some or all of the connection ports of the first component.

In some examples, the menu may show details about each of the connection ports listed in the menu, such as the name of each connection port, a path associated with each connection port, a name of another connection port or component to which the connection port or first component is connected, or other details. In some examples, a symbol may be displayed for each of the connection ports, such as the same symbol that is displayed on a component to indicate a connection port. Examples of such symbols are shown in FIG. 3B, such as the input port symbol that represents the input port 302, and the output port symbols that represent the output port 304 and three optional ports 310, 312, 314.

In some examples, the menu may indicate the status of each of the connection ports listed in the menu, such as whether each connection port is connected to another component or whether each connection port is available for a connection. For instance, the color, size, or font of the name of a connection port or the color or size of the symbol for the connection port may be used to indicate the status of the connection port. In some examples, other information about the component may be displayed in the menu, such as the name of the component, parameters associated with the component, or a processing status of the component.

The names of or symbols for the connection ports in the menu may be live links that respond to user interaction. For instance, a user may select a particular connection port (402) from the menu, e.g., by hovering a pointer (e.g., a mouse pointer) over the name of or symbol for the connection port. If the selected connection port is available for a connection, the representation of that connection port in the menu may change. In some examples, the symbol for a connection port may change size or color, flash, or undergo another change to indicate that the connection port is available for a connection. In some examples, the name of a connection port may change size, font, color, or highlighting; flash, or undergo another change to indicate that the connection port is available for a connection. In some examples, the change to the symbol for or name of a connection port may be the same change that occurs when a user hovers over a connection port of a component. In some examples, the representation of the connection port may change in one way if the connection port is available for a connection and in another way if the connection port is not available for a connection. In some examples, the pointer (e.g., the mouse pointer) may change when it hovers over a connection port that is available for a connection. For instance, the mouse pointer may change shape, blink, or undergo another change. An example of a change in a connection port in response to user interaction is shown in FIG. 3C, in which when the user hovers a mouse pointer over the symbol 312 for the error port in the menu 320, the symbol 312 for the error port is filled in to indicate that the error port is available for a connection.

To initiate a connection from a particular connection port in the menu, the user may select and drag the symbol for or name of the particular connection port in the menu (404), e.g., by clicking and dragging a mouse or by tapping and dragging on a screen. In the menu, the symbols for the connection ports, the names of the connection ports, or both, may be live links that are responsive to selection and drag-and-drop actions in the same way that a connection port included on a component is responsive to those actions. In some examples, a connection may be initiated in another way, such as by double-clicking or double tapping on the desired connection port or by right-clicking on the desired connection port. For example, as shown in FIG. 3C, the user may initiate a connection from the error port in the menu 320 by clicking on and dragging the symbol 312 for the error port.

Once the user has selected and dragged from the particular connection port, the menu disappears and the particular connection port is displayed as a visible connection port on the first component in the dataflow graph (406). A flow is displayed connected to the particular connection port. For example, as shown in FIG. 3D, after the user clicks on and drags the symbol 312 for the error port, the menu 320 disappears, and an error port 313 is displayed as a visible connection port on the reformat component 300, and a flow 318 is displayed connected to the error port 313.

In some examples, the user may drag the flow to a target connection port of the second component (408) to generate a connection between the first component and the second component. In some examples, if the target connection port is available for a connection, the symbol for or the name of the target connection pot may change when the flow is dragged over the target connection port. In some examples, the symbol for a connection port may change size or color, flash, or undergo another change to indicate that the connection port is available for a connection. In some examples, the name of a connection port may change size, font, color, or highlighting; flash, or undergo another change to indicate that the connection port is available for a connection. In some examples, the representation of the connection port may change in one way if the connection port is available for a connection and in another way if the connection port is not available for a connection.

To complete the connection to the second component, the user may drop the flow on the target connection port of the second component (410). For example, as shown in FIG. 3E, the user may drag the flow 318 to a write port 322 of an errors database 324. In this example, the symbol for the write port 322 is filled in and the name of the write port 322 is highlighted to indicate that the write port 322 is available for a connection.

After the user drops the flow on the target connection port of the second component, a connection is generated (420) between the particular connection port of the first component and the target connection port of the second component. For example, as shown in FIG. 3F, after the user drops the flow 318, e.g., by releasing the mouse click, a connection is generated between the error port 312 of the reformat component 300 and the write port 322 of the errors database 324.

In some examples, to complete the connection to the second component, the user may hover the flow (414) over the second component (e.g., anywhere in the component or over certain "hot spots" on the component, such as the corners or the center of the component). In some examples, the user may drop the flow on the second component. After the flow has been hovered for a predetermined amount of time (e.g., 1 to 2 seconds), or after the flow has been dropped on the second component, a menu listing some or all of the connection ports of the second component is displayed (416). For instance, the menu may list all of the connection ports, all of the ports that are available to receive the flow, or all of the optional ports. This approach may be useful, e.g., when the target connection port is a hidden port or when the component is too small to resolve individual ports.

In some examples, the menu may show details about each of the connection ports, such as the name of each connection port, a path associated with each connection port, a name of another connection port or component to which the connection port or component is connected, or other details. In some examples, a symbol may be displayed for each of the connection ports, such as the same symbol that is displayed on a component to indicate a connection port. In some examples, the menu may indicate the status of each of the connection ports in the representation, such as whether each connection port is connected to another component or whether each connection port is available for a connection. For instance, the color, size, or font of the name of a connection port or the color or size of the symbol for the connection port may be used to indicate the status of the connection port. In some examples, the pointer (e.g., the mouse pointer) may change when the flow is hovered over a connection port that is available for a connection. For instance, the mouse pointer may change shape, blink, or undergo another change.

The user may drop the dragged flow over the symbol for or name of the target connection port (418), thus causing a connection to be generated (420) between the particular connection port of the first component and the target connection port of the second component. In some examples, if the user has already dropped the dragged flow, the user may select the target connection port, e.g., by clicking or tapping on the symbol for or name of the target connection port.

Figure 5A:
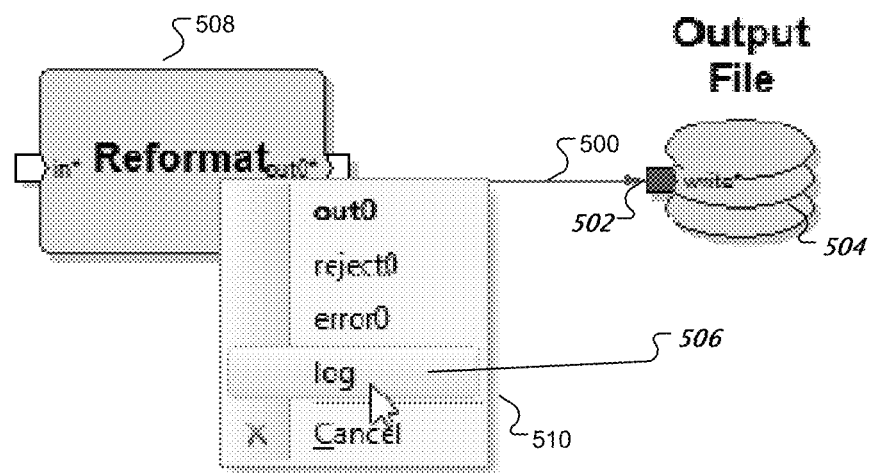
FIGS. 5A and 5B are examples of a process for generating a connection.

Referring to FIG. 5A, in some examples, a user may drag a flow 500 from a write port 502 of an output file 504 to a log port of a reformat component 508. The log port 506 is a hidden port and thus the user cannot simply drag the flow 500 to the log port 506. Instead, the user may drag the flow to the reformat component 508 and hover over the reformat component 508. After a predetermined amount of time, a menu 510 is displayed showing the connection ports of the reformat component 508 that are available to receive the flow 500. The user may drop the flow 500 onto the name for the log port 506.

Figure 5B:
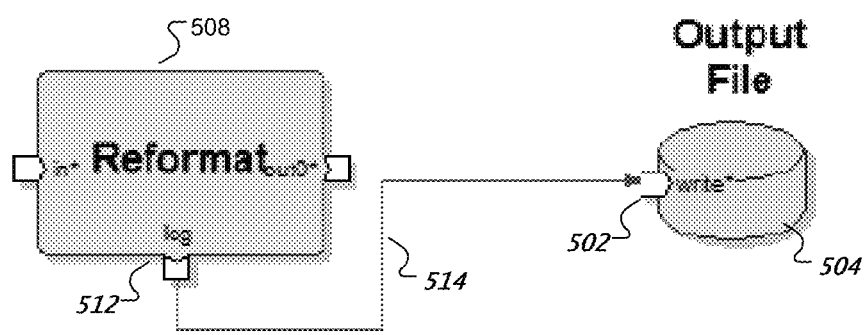

Referring to FIG. 5B, when the flow 500 is dropped onto the name of the log port 506 on the menu 510, the menu 510 disappears and a log port 512 is displayed as part of the reformat component 508, with a connection 514 between the log port 512 and the write port 502.

Figure 6:
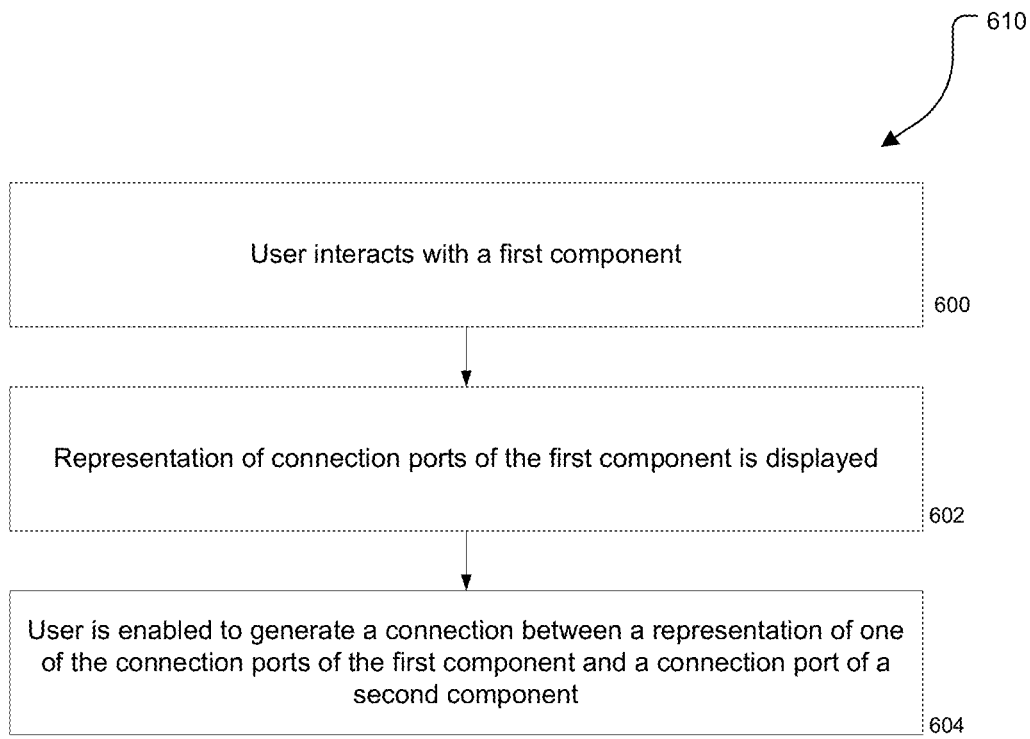
FIG. 6 is a flowchart.

Referring to FIG. 6, a general process 610 for generating a connection between a first component and a second component is provided. For example, the process 610 can be implemented by the development environment 118 of FIG. 1. In process 610, a user interacts with the first component (600), e.g., by hovering over the first component. Responsive to the user interaction with the first component, a representation of one or more connection ports of the first component is displayed (602). The representation is distinct from the display of the first component, e.g., the representation can be a menu. The user is enabled to generate a connection between the representation of one of the connection ports of the first component and a connection port of the second component (604), e.g., by clicking and dragging from the representation and to the second component, such as to the connection port of the second component.

The approach to generating connections described above can be implemented using a computing system executing suitable software. For example, the data processing system 100 can be implemented using a computing system having one or more data processors that execute instructions. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described. The pop-up window or menu 320 can also be referred to as an information bubble. The pop-up window can be resizable and configurable to show various information related to the connection ports. For example, the user can configure the pop-up window to show just the symbol and name of the connection ports, or to additional show information associated with the ports, such as the components already connected to the ports, or links to additional information on the ports. The pop-up window may have multiple menus have selectable items for assisting the connection of components. For example, there may be multiple types of connections to choose from.

The development environment 118 may include a touch screen that allows the user to manipulate the dataflow graph using touch or gesture inputs. For example, the user may use a touch input, such tapping or double tapping a component using a finger or stylus, to select the component to cause a pop-up window or menu associated with the component to appear. The pop-up window may show symbols representing connection ports of the component. The user may use a touch input to select a symbol in the pop-up window or menu, causing the pop-up window or menu to disappear, and use a sliding gesture input, such as sliding the finger or stylus on the screen away from the symbol, to generate a flow. The sliding gesture input can end at the connection port of a second component, and the user may use a touch input to select the connection port of the second component, causing the flow to connect the first and second components. If the second component has hidden ports, the user may use a touch input to select the second component and cause a pop-up window or menu to appear, showing symbols representing the connection ports of the second component. The user may use a touch input to select a symbol, causing the flow to connect to the connection port represented by the symbol.

Various gesture inputs may be used in connection with the pop-up window or menu. For example, a touch input involving one finger tapping on a component may cause a smaller pop-window to appear, showing only the hidden connection ports. A touch input involving two fingers tapping on the component may cause a larger pop-window to appear, showing all the connection ports of the component. A touch input involving three fingers tapping on the component may cause an even larger pop-window to appear, showing all the connection ports of the component with additional information associated with the connection ports.

The system may have multiple display screens, including a main display screen of a work station (e.g., desktop or laptop computer) and a secondary display screen of a tablet computer. Assume that the dataflow graph is shown on the main display screen and a computer mouse is used as the pointer device when working with the main display screen. When the pointer hovers over a component, the pop-up window can be shown either on the main screen or the secondary display screen. When the pop-up window having icons and names of the connection ports are shown on the secondary display screen of the tablet computer, the user can select one of the connection ports using a touch input. After the user selects the connection port on the secondary display screen, the selected port appears on the component in the main display screen, and the user can make a connection from the selected port to another port of another component. The window on the secondary display screen may automatically disappear after the connection is made, or remain on the display screen in case the user wants to make a connection from another port shown in the pop-up window.

The secondary display screen can be a display screen of a wearable device, such as a display screen on an eyeglass. The user can select symbols on the display screen on the eyeglass using commands (e.g., voice or head gesture commands) associated with the eyeglass.

Various types of commands can be used to select components, connection ports, or symbols representing the connection ports. For example, voice or gesture commands can be used. In the example of FIG. 3B, the user may utter a voice command "show connection ports of reformat component" to cause the pop-up window or menu 320 to appear. The user may utter a voice command "select error port" to select the error port. The user may utter a voice command "connect to write port of errors database" to connect the error port of the reformat component to the write port of the errors database. A combination of two or more of pointing device commands, touch input commands, gesture input commands, and voice commands can be used to modify the dataflow graph.

The technique of using a pop-up window to show hidden connection ports can be applied to various types of graphs, such as circuit diagrams. A circuit diagram may include, e.g., a component representing an integrated circuit having several connection pins. Some of the connection pins may be hidden from view. A user may hover a pointer above the component to cause a pop-up window to appear, showing symbols representing the connection pins of the integrated circuit. The user may select a symbol and apply a dragging action from the selected symbol to a connection port of another component in the circuit diagram. This allows the user to easily generate connections between components in a complex circuit diagram with reduced need to resize the diagram or toggle a switch to turn on or off the display of hidden connection ports.

The invention claimed is:

1. A method including:
    by a computer, displaying, on a user interface, a first component of a graphical representation of a data processing application, the display of the first component including a first port of the first component, the first component representing one or more processes of the data processing application, the one or more processes being executable to process incoming data received by a computing device;
    by the computer, responsive to a user interaction with the displayed first component, displaying a representation of one or more ports of the first component that is distinct from the display of the first component, wherein the representation of the one or more ports includes a representation of a second port of the first component that is not included in the display of the first component, and wherein the representation of the second port is responsive to a user interaction with the representation of the second port; and
    by the computer, enabling the user to apply a click-and-drop action to (i) the representation of the second port of the first component or (ii) a port of a second component of the graphical representation of the data processing application to generate a connection between the second port of the first component and the port of the second component, in which the connection is indicative of a flow of data during execution of the data processing application, the flow of data being either (i) data records output from the second port of the first component following processing by the one or more processes represented by the first component and input into the port of the second component or (ii) data records output from the port of the second component and input into the second port of the first component for processing by the one or more processes represented by the first component.

2. The method of claim 1, in which displaying the representation of the one or more ports includes displaying a list of the one or more ports, wherein the list of the one or more ports is distinct from the display of the first component.

3. The method of claim 1, in which the user interaction with the displayed first component includes hovering a pointer over the first component.

4. The method of claim 1, in which displaying the first component includes displaying fewer than all of the ports of the first component.

5. The method of claim 1, in which displaying the first component includes not displaying optional ports of the first component prior to the user interaction with the first component.

6. The method of claim 1, in which displaying the first component includes displaying only the ports of the first component that are associated with a connection.

7. The method of claim 1, in which displaying the representation of the one or more ports of the first component does not alter the display size of the first component.

8. The method of claim 1, in which the representation of the ports includes the indicator of the status of at least one of the ports.

9. The method of claim 1, in which the representation of the second port changes responsive to user interaction with the representation of the second port to indicate the status of the second port.

10. The method of claim 1, in which the status of a port indicates whether the port is available for a connection.

11. The method of claim 1, in which enabling the user to generate a connection includes enabling the user to select the second port from the representation of the one or more ports of the first component.

12. The method of claim 1, in which enabling the user to use a click-and-drop action to generate a connection includes enabling the user to drag a pointer from the second port of the first component to the second component.

13. The method of claim 12, including displaying a representation of one or more of the ports of the second component responsive to the user dragging the pointer to the second component.

14. The method of claim 13, in which only ports of the second component that are available for a connection are included in the representation of the ports of the second component.

15. The method of claim 1, including updating one or more data structures implementing the data processing application to cause data to flow between the first component and the second component according to the generated connection during execution of the data processing application.

16. A method of connecting components in a graph, the method including:
displaying, by a computer, in a user interface, a graph having a first component and a second component, the graph representing a data processing application, the first component representing one or more processes of the data processing application, the one or more processes being executable to process incoming data received by a computing device;
displaying, by the computer, a symbol representing a port of the first component, the symbol being distinct from the first component, wherein the port represented by the symbol is not included in the display of the graph, and wherein the symbol is responsive to a user interaction with the symbol; and
enabling, by the computer, a connection to be made between the port of the first component and a second component in response to a click-and-drop action applied to the symbol or to a port of the second component,
in which the connection is indicative of a flow of data during execution of the data processing application, the flow of data being either (i) data records output from the port of the first component following processing by the one or more processes represented by the first component and input into the port of the second component or (ii) data records output from the port of the second component and input into the second port of the first component for processing by the one or more processes represented by the first component.

17. The method of claim 16 in which the click-and-drop action includes a dragging action from the symbol to the second component.

18. The method of claim 17 in which the dragging action starts at the symbol representing the port of the first component and ends at the port of the second component.

19. The method of claim 17 in which the dragging action starts at the symbol representing the port of the first component and ends at a second symbol representing the port of the second component, the second symbol being distinct from the second component.

20. The method of claim 16 in which displaying a symbol representing the port of the first component includes displaying a window that includes the symbol.

21. The method of claim 16 in which enabling a connection to be made between the port of the first component and the second component includes enabling a connection to be made between the port of the first component and the second component without changing a display size of the first component.

22. A method of connecting components in a graph, the method including:
by a computer, interacting with a first component of a graphical representation of a data processing application, the first component representing one or more processes of the data processing application, the one or more processes being executable to process incoming data received by a computing device, the interacting causing a first symbol to be displayed, the first symbol representing a first port of the first component, the first symbol being distinct from the first component, wherein the first port represented by the symbol is not included in the graphical representation of the data processing application, and wherein the first symbol is responsive to a user interaction with the first symbol; and
by the computer, using a click-and-drop action to connect the first port of the first component to a second port of a second component of the graphical representation of the data processing application by selecting the first symbol and applying a dragging action from the first symbol to the second port or a second symbol representing the second port, in which the connection is indicative of a flow of data during execution of the data processing application, the flow of data being either (i) data records output from the first port of the first component following processing by the one or more processes represented by the first component and input into the second port of the second component or (ii) data records output from the second port of the second component and input into the first port of the first component for processing by the one or more first processes represented by the first component.

23. The method of claim 22 in which causing a first symbol representing the first port to be displayed comprises causing a window that includes the first symbol to be displayed.

24. The method of claim 22 in which the dragging action causes a flow to be dragged to the second port or the second symbol representing the second port.

25. A non-transitory computer-readable medium storing instructions for causing a computer system to:

display, on a user interface, a first component of a graphical representation of a data processing application, the display of the first component including a first port of the first component, the first component representing one or more processes of the data processing application, the one or more processes being executable to process incoming data received by a computing device;

responsive to a user interaction with the displayed first component, displaying a representation of one or more ports of the first component that is distinct from the display of the first component, wherein the representation of the one or more ports includes a representation of a second port of the first component that is not included in the display of the first component, and wherein the representation of the second port is responsive to a user interaction with the representation of the second port; and enable the user to apply a click-and-drop action to (i) the representation of the second port of the first component or (ii) a port of the second component of the graphical representation of the data processing application to generate a connection between the second port of the first component and the port of the second component, in which the connection is indicative of a flow of data during execution of the data processing application, the flow of data being either (i) data records output from the second port of the first component following processing by the one or more processes represented by the first component and input into the port of the second component or (ii) data records output from the port of the second component and input into the second port of the first component for processing by the one or more processes represented by the first component.

26. The non-transitory computer-readable medium of claim 25, in which the user interaction with the displayed first component includes hovering a pointer over the first component.

27. The non-transitory computer-readable medium of claim 25, in which displaying the first component includes displaying fewer than all of the ports of the first component.

28. The non-transitory computer-readable medium of claim 25, in which displaying the representation of the ports includes displaying a representation of ports that are not included in the display of the first component.

29. The non-transitory computer-readable medium of claim 25, in which displaying the representation of the one or more ports of the first component does not alter the display size of the first component.

30. The non-transitory computer-readable medium of claim 25, in which the representation of the second port changes responsive to user interaction with the representation of the second port to indicate the status of the second port.

31. The non-transitory computer-readable medium of claim 25, in which enabling the user to generate a connection includes enabling the user to select the second port from the representation of the one or more ports of the first component.

32. The non-transitory computer-readable medium of claim 25, storing instructions for causing the computer system to display a representation of one or more of the ports of the second component responsive to the user dragging a pointer from the particular port of the first component to the second component.

33. The non-transitory computer-readable medium of claim 25, storing instructions for causing the computer system to update one or more data structures implementing the data processing application to cause data to flow between the first component and the second component according to the generated connection during execution of the data processing application.

34. A computing system including:

at least one processor configured to:

display, on a user interface, a first component of a graphical representation of a data processing application, the display of the first component including a first port of the first component, the first component representing one or more processes of the data processing application, the one or more processes being executable to process incoming data received by a computing device;

responsive to a user interaction with the displayed first component, display a representation of one or more ports of the first component that is distinct from the display of the first component, wherein the representation of the one or more ports includes a representation of a second port of the first component that is not included in the display of the first component, and wherein the representation of the second port is responsive to a user interaction with the representation of the second port; and enable the user to apply a click-and-drop action to (i) the representation of the second port of the first component or (ii) a port of a second component of the graphical representation of the data processing application to generate a connection between the second port of the first component and the port of the second component, in which the connection is indicative of a flow of data during execution of the data processing application, the flow of data being either (i) data records output from the second port of the first component following processing by the one or more processes represented by the first component and input into the port of the second component or (ii) data records output from the port of the second component and input into the second port of the first component for processing by the one or more processes represented by the first component during execution of the data processing application.

35. The computing system of claim 34, in which the user interaction with the first component includes hovering a pointer over the first component.

36. The computing system of claim 34, in which displaying the first component includes displaying fewer than all of the ports of the first component.

37. The computing system of claim 34, in which displaying the representation of the ports includes displaying a representation of ports that are not included in the display of the first component.

38. The computing system of claim 34, in which displaying the representation of the one or more ports of the first component does not alter the display size of the first component.

39. The computing system of claim 34, in which the representation of the second port changes responsive to user interaction with the representation of the second port to indicate the status of the second port.

40. The computing system of claim 34, in which enabling the user to generate a connection includes enabling the user to select the second port from the representation of the one or more ports of the first component.

41. The computing system of claim 34, in which the at least one processor is configured to display a representation of one or more of the ports of the second component responsive to the user dragging a pointer from the particular port of the first component to the second component.

42. The computing system of claim 34, in which the at least one processor is configured to update one or more data structures implementing the data processing application to cause data to flow between the first component and the second component according to the generated connection during execution of the data processing application.

43. A computing system including:
means for displaying, on a user interface, a first component of a graphical representation of a data processing application, the display of the first component including a first port of the first component, the first component representing one or more processes of the data processing application, the one or more processes being executable to process incoming data received by a computing device;
means for, by the computer, responsive to a user interaction with the displayed first component, displaying a representation of one or more ports of the first component that is distinct from the display of the first component, wherein the representation of the one or more ports includes a representation of a second port of the first component that is not included in the display of the first component, and wherein the representation of the second port is responsive to a user interaction with the representation of the second port; and
means for enabling the user to apply a click-and-drop action to (i) the representation of the second port of the first component or (ii) a port of a second component of the graphical representation of the data processing application to generate a connection between the second port of the first component and the port of the second component,
in which the connection is indicative of a flow of data during execution of the data processing application, the flow of data being either (i) data records output from the second port of the first component following processing by the one or more processes represented by the first component and input into the port of the second component or (ii) data records output from the port of the second component and input into the second port of the first component for processing by the one or more processes represented by the first component.

44. A non-transitory computer-readable medium storing instructions for causing a computer system to:
display, by the computer system, in a user interface, a graph having a first component and a second component, the graph representing a data processing application, the first component representing one or more processes of the data processing application, the one or more processes being executable to process incoming data received by a computing device;
display, by the computer system, in the user interface, a symbol representing a port of the first component, the symbol being distinct from the first component, wherein the port represented by the symbol is not included in the display of the graph, and wherein the symbol is responsive to a user interaction with the symbol; and
enabling, by the computer, a connection to be made between the port of the first component and a second component in response to a click-and-drop action applied to the symbol or to a port of the second component,
in which the connection is indicative of a flow of data during execution of the data processing application, the flow of data being either (i) data records output from the port of the first component following processing by the one or more processes represented by the first component and input into the port of the second component or (ii) data records output from the port of the second component and input into the second port of the first component for processing by the one or more processes represented by the first component.

45. A computing system for connecting components in a graph, the computing system including:
at least one processor configured to:
display, by a computer, in a user interface, a graph having a first component and a second component, the graph representing a data processing application, the first component representing one or more processes of the data processing application, the one or more processes being executable to process incoming data received by a computing device;
display, by the computer, in the user interface, a symbol representing a port of the first component, the symbol being distinct from the first component, wherein the port represented by the symbol is not included in the display of the graph, and wherein the symbol is responsive to a user interaction with the symbol; and
enabling, by the computer, a connection to be made between the port of the first component and a second component in response to a click-and-drop action applied to the symbol or to a port of the second component,
in which the connection is indicative of a flow of data during execution of the data processing application, the flow of data being either (i) data records output from the port of the first component following processing by the one or more processes represented by the first component and input into the port of the second component or (ii) data records output from the port of the second component and input into the second port of the first component for processing by the one or more processes represented by the first component.

46. A computing system for connecting components in a graph, the computing system including:
    means for displaying, by a computer, in a user interface, a graph having a first component and a second component, the graph representing a data processing application, the first component representing one or more processes of the data processing application, the one or more processes being executable to process incoming data received by a computing device;
    means for displaying, by the computer, a symbol representing a port of the first component, the symbol being distinct from the first component, wherein the port represented by the symbol is not included in the display of the graph, and wherein the symbol is responsive to a user interaction with the symbol; and
    means for enabling, by the computer, a connection to be made between the port of the first component and a second component in response to a click-and-drop action applied to the symbol or to a port of the second component,
    in which the connection is indicative of a flow of data during execution of the data processing application, the flow of data being either (i) data records output from the port of the first component following processing by the one or more processes represented by the first component and input into the port of the second component or (ii) data records output from the port of the second component and input into the second port of the first component for processing by the one or more processes represented by the first component.

47. A non-transitory computer-readable medium storing instructions for causing a computer system to:
    interact with a first component of a graphical representation of a data processing application, the first component representing one or more processes of the data processing application, the one or more processes being executable to process incoming data received by a computing device, the interacting causing a first symbol to be displayed, the first symbol representing a first port of the first component, the first symbol being distinct from the first component, wherein the first port represented by the symbol is not included in the graphical representation of the data processing application, and wherein the first symbol is responsive to a user interaction with the first symbol; and
    use a click-and-drop action to connect the first port of the first component to a second port of a second component of the graphical representation of the data processing application by selecting the first symbol and applying a dragging action from the first symbol to the second port or a second symbol representing the second port,
    in which the connection is indicative of a flow of data during execution of the data processing application, the flow of data being either (i) data records output from the first port of the first component following processing by the one or more processes represented by the first component and input into the second port of the second component or (ii) data records output from the second port of the second component and input into the first port of the first component for processing by the one or more processes represented by the first component.

48. The non-transitory computer-readable medium of claim 47 in which the dragging action causes a flow to be dragged to the second port or the second symbol representing the second port.

49. A computing system for connecting components in a graph, the computing system including:
    at least one processor configured to:
        interact with a first component of a graphical representation of a data processing application, the first component representing one or more processes of the data processing application, the one or more processes being executable to process incoming data received by a computing device, the interacting causing a first symbol to be displayed, the first symbol representing a first port of the first component, the first symbol being distinct from the first component, wherein the first port represented by the symbol is not included in the graphical representation of the data processing application, and wherein the first symbol is responsive to a user interaction with the first symbol; and
        use a click-and-drop action to connect the first port of the first component to a second port of a second component of the graphical representation of the data processing application by selecting the first symbol and applying a dragging action from the first symbol to the second port or a second symbol representing the second port,
        in which the connection is indicative of a flow of data during execution of the data processing application, the flow of data being either (i) data records output from the first port of the first component following processing by the one or more processes represented by the first component and input into the second port of the second component or (ii) data records output from the second port of the second component and input into the first port of the first component for processing by the one or more processes represented by the first component.

50. The computing system of claim 49 in which the dragging action causes a flow to be dragged to the second port or the second symbol representing the second port.

51. A computing system for connecting components in a graph, the computing system including:
    means for interacting with a first component of a graphical representation of a data processing application, the first component representing one or more processes of the data processing application, the one or more processes being executable to process incoming data received by a computing device, the interacting causing a first symbol to be displayed, the first symbol representing a first port of the first component, the first symbol being distinct from the first component, wherein the first port represented by the symbol is not included in the graphical representation of the data processing application, and wherein the first symbol is responsive to a user interaction with the first symbol; and
    means for using a click-and-drop action to connect the first port of the first component to a second port of a second component of the graphical representation of the data processing application by selecting the first symbol and applying a dragging action from the first symbol to the second port or a second symbol representing the second port,
    in which the connection is indicative of a flow of data during execution of the data processing application, the flow of data being either (i) data records output from the first port of the first component following processing by the one or more processes represented by the first component and input into the second port of the second component or (ii) data records output from the second port of the second component and input into the first port of the first component for processing by the one or more processes represented by the first component.

\* \* \* \* \*

UNITED STATES PATENT AND TRADEMARK OFFICE
CERTIFICATE OF CORRECTION

PATENT NO. : 9,984,482 B2  
APPLICATION NO. : 13/974537  
DATED : May 29, 2018  
INVENTOR(S) : Erik Bator et al.

Page 1 of 1

It is certified that error appears in the above-identified patent and that said Letters Patent is hereby corrected as shown below:

On the Title Page

Column 1, Line 3, after "0 days." delete "days.".

In the Claims

Column 21, Lines 2-3, Claim 34, delete "component during execution of the data processing application." and insert -- component. --.

Signed and Sealed this  
Tenth Day of July, 2018

Andrei Iancu  
*Director of the United States Patent and Trademark Office*